(12) United States Patent
Simental et al.

(10) Patent No.: US 7,805,005 B2
(45) Date of Patent: Sep. 28, 2010

(54) EFFICIENT IMAGERY EXPLOITATION EMPLOYING WAVELET-BASED FEATURE INDICES

(75) Inventors: Edmundo Simental, Alexandria, VA (US); Edward H. Bosch, Woodbridge, VA (US); Robert S. Rand, Fairfax Station, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1087 days.

(21) Appl. No.: 11/484,559

(22) Filed: Jul. 12, 2006

(65) Prior Publication Data

US 2007/0031042 A1 Feb. 8, 2007

Related U.S. Application Data

(60) Provisional application No. 60/704,416, filed on Aug. 2, 2005.

(51) Int. Cl.
*G06K 9/46* (2006.01)

(52) U.S. Cl. .......................................... 382/191; 702/5

(58) Field of Classification Search .................. 382/191; 702/2, 5
See application file for complete search history.

(56) References Cited

U.S. PATENT DOCUMENTS

| | | | |
|---|---|---|---|
| 5,124,930 A | 6/1992 | Nicolas et al. |
| 5,757,309 A | 5/1998 | Brooks et al. |
| 5,933,546 A | 8/1999 | Stone |
| 6,075,891 A | 6/2000 | Burman |
| 6,182,018 B1 | 1/2001 | Tran et al. |
| 6,249,749 B1 | 6/2001 | Tran et al. |
| 6,393,159 B1 | 5/2002 | Prasad et al. |
| 6,539,122 B1 | 3/2003 | Abousleman |
| 6,546,117 B1 | 4/2003 | Sun et al. |
| 6,631,364 B1 | 10/2003 | Rioux et al. |
| 6,647,252 B2 | 11/2003 | Smith et al. |
| 6,678,416 B1 | 1/2004 | Sun et al. |

(Continued)

OTHER PUBLICATIONS

Bosch et al. (Apr. 2003) "Wavelet-based dimension reduction for hyperspectral image classification." SPIE vol. 5093, pp. 57-69.*

(Continued)

*Primary Examiner*—Brian P Werner
*Assistant Examiner*—Barry Drennan
(74) *Attorney, Agent, or Firm*—Earl H. Baugher, Jr.

(57) ABSTRACT

A wavelet-based band difference-sum ratio method reduces the computation cost of classification and feature extraction (identification) tasks. A Generalized Difference Feature Index (GDFI), computed using wavelets such as Daubechies wavelets, is employed in a method to automatically generate a large sequence of generalized band ratio images. In select embodiments of the present invention, judicious data mining of the large set of GDFI bands produces a small subset of GDFI bands suitable to identify specific Terrain Category/Classification (TERCAT) features. Other wavelets, such as Vaidyanathan, Coiflet, Beylkin, and Symmlet and the like may be employed in select embodiments. The classification and feature extraction (identification) performance of the band ratio method of the present invention is comparable to that obtained with the same or similar data sets using much more sophisticated methods such as discriminants, neural net classification, endmember Gibbs-based partitioning, and genetic algorithms.

11 Claims, 12 Drawing Sheets
(5 of 12 Drawing Sheet(s) Filed in Color)

U.S. PATENT DOCUMENTS

| | | |
|---|---|---|
| 6,684,208 B2 | 1/2004 | Kil et al. |
| 6,738,523 B1 | 5/2004 | Small et al. |
| 6,947,869 B2 | 9/2005 | Palmadesso et al. |
| 2005/0047663 A1 | 3/2005 | Keenan et al. |

OTHER PUBLICATIONS

Rand et al. (Jun. 2003) "Spatially smooth partitioning of hyperspectral imagery using spectral/spatial measures of disparity." IEEE Trans. on Geoscience and Remote Sensing, vol. 41 No. 6, pp. 1479-1490.*

Simental et al. (Aug. 2004) "Wavelet-based feature indices as a data mining tool for hyperspectral imagery exploitation." SPIE vol. 5558, pp. 169-180.*

Microsoft Corp. (Jun. 2003) "Info: Visual Studio .NET 2003 Readme (Part 1)." http://support.microsoft.com/822354 as archived by The Internet Archive, http://www.archive.org/.*

* cited by examiner

EFFICIENT IMAGERY EXPLOITATION EMPLOYING WAVELET-BASED FEATURE INDICES

RELATED APPLICATIONS

Under 35 U.S.C. §119(e)(1), this application claims the benefit of prior co-pending U.S. Provisional Patent Application Ser. No. 60/704,416, Wavelet-Based Feature Indices and Their Use as a Data Mining Tool for Hyperspectral Imagery Exploitation, by Simental et al., filed Aug. 2, 2005, and incorporated herein by reference.

STATEMENT OF GOVERNMENT INTEREST

Under paragraph 1(a) of Executive Order 10096, the conditions under which this invention was made entitle the Government of the United States, as represented by the Secretary of the Army, to an undivided interest therein on any patent granted thereon by the United States. This patent has multiple assignees. This and related patents are available for licensing to qualified licensees. Please contact Jeff Walaszek at 703 428-672 or Phillip Stewart at 601 634-4113.

BACKGROUND

Multispectral and hyperspectral images are composed of amounts of data that are impractical to analyze manually. These data include multiple spectral bands that are not visualized or assessed readily. Conventional multi-spectral sensors provide only a few spectral bands of imagery, nominally covering pre-specified portions of the visible to the near infrared spectra. Conventional hyperspectral sensors may cover hundreds of spectral bands spanning a pre-specified portion of the electromagnetic spectrum. Thus, hyperspectral sensors may provide greater spectral discrimination than multispectral sensors and allow non-literal processing of data to detect and classify material content as well as structure.

An image may be represented mathematically as a matrix of m rows and n columns of elements. An element of such a matrix defining a two-dimensional (2-D) image is termed a picture element, or pixel. An image is usable when a viewer is able to partition the image into a number of recognizable regions that correspond to known features, such as trees, lakes, and man-made objects. Once this level of imaging is attained, each distinct feature and object may be identified since each is represented by an essentially uniform field. The process that generates such uniform fields is known as segmentation.

Many techniques have been used to segment images. Segmentation may be class-interval based, edge-based, and region-based.

For 8-bit precision data, a given image may assume pixel (element) values from a minimum of zero to a maximum of 255. By mapping into one category those pixels whose intensity values are within a certain range or class interval, e.g., 0-20, a simple threshold method may be used to segment.

An edge may be defined by observing the difference between adjacent pixels. Edge-based segmentation generates an edge map, linking the edge pixels to form a closed contour. In conventional edge-based segmentation, well-defined mathematical formulae are used to define an edge. After edges are extracted, another set of mathematical rules may be used to join, eliminate, or both join and eliminate edges, thus generating a closed contour around a uniform region. That is, the scene itself is not used to define an edge even though, globally, an edge may be defined by the scene.

Region-based segmentation is the antithesis of edge-based segmentation. It begins at the interior of a potentially uniform field rather than at its outer boundary. It may be initiated with any two interior adjacent pixels. One or more rules, such as a Markov Random Field (MRF) approach, are used to decide whether merging of these two candidates should occur. In general, conventional region-based segmentation is performed on an image within but a single spectral band, follows well-defined mathematical decision rules, is computationally intensive, and thus expensive, and is not self-determining or self-calibrating.

Color-based segmentation requires input of three spectrally distinct bands or colors. A true color video image may be generated from a scene taken by three bands of blue, green and red. They may be combined into a composite image using individual filters of the same three colors. The resultant color image may be considered a segmented image because each color may represent a uniform field.

If a region or an edge may be generated from the content of the scene, it should be possible to integrate both region-based and edge-based segmentation methods into a single, integrated process. The process by which a segment, or region, is matched with a rule set, or model, is termed identification.

Identification occurs after segmentation. It results in labeling structure using commonly-accepted names, such as river, forest or automobile. While identification may be achieved in a number of ways, such as statistical document functions and rule-based and model-based matching, all require extracting representative features as an intermediate step. Extracted features may be spectral reflectance-based, texture-based, and shape-based.

Statistical pattern recognition exploits standard multivariate statistical methods. Rule-based recognition schemes use conventional artificial intelligence (AI). Shape analysis employs a model-based approach that requires extraction of features from the boundary contour or a set of depth contours. Sophisticated features that may be extracted include Fourier descriptors and moments. Structure is identified when a match is found between observed structure and a calibration sample. A set of calibration samples constitutes a calibration library. A conventional library is both feature and full-shape based.

Feature extraction utilizes a few, but effective, representative attributes to characterize structure. While it capitalizes on economy of computation, it may select incorrect features and apply incomplete information sets in the recognition process. A full-shape model assumes that structure is not contaminated by noise, obscured by ground clutter, or both. In general, this assumption does not correspond to the operation of actual sensors.

Depth contours match three-dimensional (3-D) structure generated from a sensor with 3-D models generated from wire frames. In general, all actual images are 3-D because the intensity values of the image constitute the third dimension, although all are not created equal. For example, a LADAR image has a well-defined third dimension and a general spectral-based image does not. However, most objective discrimination comes from the boundary contour, not the depth contour.

Detection, classification (segmentation), and identification techniques applied to hyperspectral imagery are inherently either full-pixel or mixed-pixel techniques in which each pixel vector in the image records the spectral information. Full-pixel techniques operate on the assumption that each pixel vector measures the response of one predominate underlying material, or signal, at each site in a scene. However, the underlying assumption for mixed-pixel techniques is that each pixel vector measures the response of multiple underlying materials, or signals, at each site. In actuality, an image may be represented best by a combination of the two. Although some sites represent a single material, others are mixtures of multiple materials. Rand, Robert S. and Daniel M. Keenan, *A Spectral Mixture Process Conditioned by Gibbs-Based Partitioning*, IEEE Transactions on Geoscience and Remote Sensing, Vol. 39, No. 7, pp. 1421-1434, July 2001.

The simplest full-pixel technique involves spectral matching. Spectra of interest in an image are matched to training spectra obtained from a library or the image itself. Metrics for determining the degree of match include: Euclidian distance, derivative difference, and spectral angle. If the relative number of mixed pixels in a scene is significant, then spectral matching of this type is not employed. Class label assignments generated by spectral matching algorithms are not affected by spatial neighborhoods, however, consistency of class labels in localized spatial neighborhoods, termed "spatial localization," is important in mapping applications.

Other full-pixel methods include various supervised and unsupervised segmentation techniques. These are based on statistical and pattern recognition methods normally applied to multispectral image processing. The training is also done using data from libraries or the scene imagery itself. Specific techniques include: statistical linear discrimination, e.g., Fisher's linear discriminant; quadratic multivariate classifiers, e.g., Mahalanobis and Bayesian maximum likelihood (ML) classifiers; and neural networks.

The quadratic methods require low-dimensional pixel vectors, and thus are preceded by a data reduction operation to reduce the number of spectral bands addressed. Effective neural networks, such as the multilayer feedforward neural network (MLFN), may be built to model quadratic and higher order decision surfaces without data reduction. Although the MLFN may be trained to identify materials perturbed by a limited amount of mixing, usually it does not include any spatial localization in the decision process.

The most common unsupervised algorithms for clustering imagery are KMEANS and ISODATA, in which the metric used in determining cluster membership is Euclidian distance. Euclidian distance does not provide an adequate response when fine structure or shapes are presented in high resolution spectra, being overly sensitive to intensity changes. Additionally, these methods do not include any spatial localization in the clustering operation.

Spectral mixture analysis (SMA) techniques used with mixed-pixel approaches address some of the shortcomings of full-pixel techniques. SMA employs linear statistical modeling, signal processing techniques, or both. SMA techniques are governed by the relationship:

$$X_s = H\beta_s + \eta_s \quad (1)$$

where:
$X_s$=observed reflected energy from site s
$\beta_s$=modeling parameter vector associated with mixture proportions at site s
$\eta_s$=random variable for model error at site s
H=the matrix containing the spectra of pure materials of interest The matrix, H, is presumed known and fixed, although for most actual materials there exists no single fixed spectral signatures to represent the pure materials.

The basic SMA may be modified to partition the H matrix into desired and undesired signatures. Subspace projections orthogonal or oblique to the undesired signatures and noise components are computed. Orthogonal subspace projection (OSP) is applied to hyperspectral imagery to suppress undesirable signatures and detect signatures of interest. This is shown in the relationship:

$$H = [D, U] \quad (2)$$

where:
D=matrix of known spectra for a target of interest
U=the matrix of undesired, but known, spectra The matrix, U, may be unknown if D is a minor component of the scene.

The above modifications are best suited to targeting applications rather than mapping.

From the early days of multi-spectral remote sensing to the present, earth scientists have been thoroughly and meticulously measuring the wavelengths and intensity of visible and near-infrared light reflected by the land surface back up into space. In some instances, they have used either a "Vegetation Index" (VI) or a "Normalized Difference Vegetation Index" (NDVI) to quantify the concentrations of green leaf vegetation around the planet. Weier, J. and D. Herring, *Measuring Vegetation, NDVI and EVI*, Earth Observatory, September 1999. These indices may be described mathematically as:

$$VI = \frac{b_1}{b_2} \quad (3)$$

And NDVI as:

$$NVDI = \frac{(b_1 - b_2)}{(b_1 + b_2)} \quad (4)$$

Where
VI is vegetation index,
NDVI is the Normalized Difference Vegetation Index, and
$b_1$ is a near infrared spectral band, and
$b_2$ is a visible spectral band.

VI and NDVI involve mathematical operations of a combination of two or more bands aimed at enhancing vegetation features. VI and NDVI yield estimates of vegetation health, provide a means of monitoring changes in vegetation relative to biomass and color, and serve as indicators of drought, climate change, precipitation, and the like. Kidwell, K. B., *Global Vegetation Index User's Guide*, U.S. Department of Commerce/National Oceanic and Atmospheric Administration, July 1997 (estimate of health); Boone, R., K. Galvin, N. Smith, and S. Lynn, *Generalizing El Nino Effects upon Maasai Livestock Using Hierarchical Clusters of Vegetation Patterns*, Photogrammetric Engineering & Remote Sensing, Vol. 66(6): pages 737-744, June 2000 (monitoring changes); Kassa, A., *Drought Risk Monitoring for the Sudan*, Master of Science Dissertation, University College, London, UK, August 1999 (indicator of climate).

The usefulness of the VI and NDVI is well documented and it is clear that these techniques have contributed substantial information to vegetation studies and other investigations using remote sensing. VI and NDVI have been suggested as means for identifying features other than vegetation, but these suggestions have not been aggressively investigated. Deer, P. J., *Digital Detection Techniques: Civilian and Military Applications*, International Symposium on Spectral Sensing Research, Melbourne, Australia, November, 1995.

Analysis of all possible ratio combinations in hyperspectral data approaches mathematical chaos, thus, it was postulated that other difference-sum band ratios may provide unexpected relationships yielding useful information about terrain features, both in multi-spectral and hyperspectral data. Embodiments of the present invention address reducing the number of ratio combinations to identify multiple object classes, not just vegetation.

Advances in hyperspectral sensor technology provide high quality data for the accurate generation of terrain categorization/classification (TERCAT) maps. The generation of TERCAT maps from hyperspectral imagery can be accomplished using a variety of spectral pattern analysis algorithms; however, the algorithms are sometimes complex, and the training of such algorithms can be tedious. Further, hyperspectral imagery implies large data files since contiguous spectral bands are highly correlated. The correlation further implies redundancy in classification/feature extraction computations.

The use of wavelets to generate a set of "Generalized Difference Feature Indices" (GDFI) transforms a hyperspectral image cube into a derived set of GDFI bands. Each index is a "derived band" that is a generalized ratio of the originally available bands. Thus, select embodiments of the present invention generate a set of derived bands. For example, an index may be generated with a Daubechies wavelet with two (2), four (4), eight (8) or more "vanishing moments."

Vanishing moments, filter and smoothing coefficients, and low and high frequency coefficients are all related to the order of the wavelet, and these terms are sometimes used interchangeably, e.g., a wavelet of order four (4) may be referred to as "a wavelet with four (4) vanishing moments." A wavelet with x vanishing moments, i.e., order x, means that the first x moments starting from zero (0) moment are equal to zero (0). This suppresses signals that are of a polynomial of degree less than or equal to x−1.

The number of filter coefficients is chosen when the order of the wavelet is established. For example, in research into data mining for select embodiments of the present invention, the initial effort started with [Daubechies 2, lag 3], i.e., the Haar wavelet, and increased both Daubechies order and lag to perform efficient data mining. The collection of these derived bands becomes the indices for the specific feature of interest. For example if the difference-sum ratios and Daubechies wavelets with one vanishing moment, i.e., two (2) filtering coefficients, and lag of 3 that "identifies" or "highlights" roads and roads may also be identified with two vanishing moments, i.e., four (4) filtering coefficients, and a lag of 5, then the indices for roads may be described as [Daubechies 2, lag 3] and [Daubechies 4, lag 5].

A commonly known special case of a GDFI is a Limited Difference Feature Index (LDFI) approach as described above for the Normalized Difference Vegetation Index (NDVI). Numerous other limited band-ratio indices readily identifying individual specific scene features are LDFIs, i.e., single purpose special cases of the GDFI. Generating a set of GDFI bands is fast and simple. However, there are a large number of possible bands and only a few "generalized ratios (indices)" prove useful. Judicious data mining of the large set of GDFI bands produces a small subset of GDFI bands suitable to identify specific TERCAT features.

In select embodiments of the present invention, a wavelet-based difference-sum band ratio method reduces the computation cost of classification and feature extraction (identification) tasks. A Generalized Difference Feature Index (GDFI), computed using wavelets such as Daubechies wavelets, is employed in an embodiment of the present invention as a method to automatically generate a large sequence of generalized band ratio images. Other wavelets, such as Vaidyanathan, Coiflet, Beylkin, and Symmlet and the like may be employed in select embodiments of the present invention. Selection of the optimum wavelet is important for computational efficiency. Simental, E., and T. Evans, *Wavelet Denoising of Hyperspectral Data,* International Symposium for Spectral Sensing Research, San Diego, Calif., June 1997.

A description of a method for analyzing a signal by wavelets is provided in U. S. Pat. No. 5,124,930, Method for Analyzing a Signal by Wavelets, to Nicolas et al., Jun. 23, 1992, incorporated herein by reference.

The classification and feature extraction performance of a band ratio method of the present invention was comparable to results obtained with the same data sets using much more sophisticated methods such as discriminants and neural net classification and endmember Gibbs-based partitioning. Rand, R. S., and E. H. Bosch, *The Effect of Wavelet-based Dimension Reduction on Neural Network Classification and Subpixel Targeting Algorithms,* SPIE Defense and Security Symposium, Orlando, Fla., April 2004 (discriminants and neural net). Rand and Keenan (2001) (endmember partitioning). The performance of an embodiment of the present invention was comparable to results obtained from a similar data set using genetic algorithms. Simental, E., D. Ragsdale, E. Bosch, R. Dodge Jr., and R. Pazak, *Hyperspectral Dimension Reduction and Elevation Data for Supervised Image Classification,* American Society for Photogrammetry and Remote Sensing Conference, Anchorage, Ak., May 2003.

Select embodiments of the present invention extract (identify) features from hyperspectral imagery rapidly and reliably, inexpensively permitting ready identification of pre-specified features.

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION

In select embodiments of the present invention, the expansion of a simple hyperspectral ratio with wavelet coefficients provides an easy, fast, and reliable method for analysis, categorization, or feature extraction (identification). In addition to the analysis of hyperspectral datasets, select embodiments of the present invention are sufficiently general for use with any high dimensional dataset.

Select embodiments of the present invention sample all band ratio combinations in hyperspectral data for rapid combinatorial computations that integrate wavelet and wavelet-variogram techniques for better data anomaly filtering and detection. In select embodiments of the present invention, a very efficient software package display results in a form that is easily comprehensible for classification and feature extraction analysis. In select embodiments of the present invention, one is able to investigate if there are band ratios that provide potentially useful information in support of classification and feature extraction tasks.

In select embodiments of the present invention, all possible band ratio combinations need not be computed. Several factors contribute to yielding a small subset of ratios that provides viable information.

Figure 1:
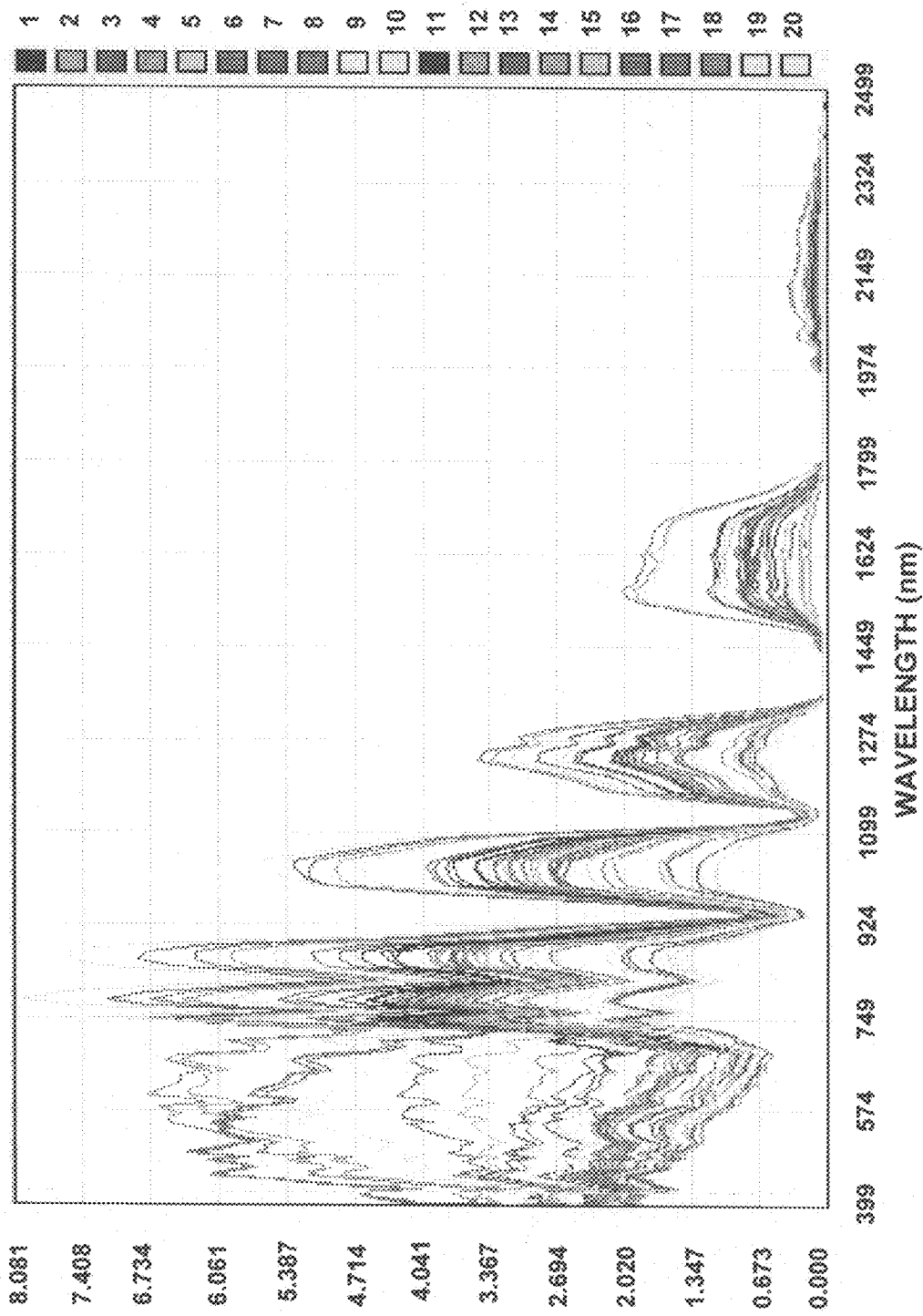
FIG. 1, provided for illustration purposes only, is a plot of wavelength, nanometers ($\eta$m), versus radiance for most of the features in a hyperspectral data scene.
Figure 1A:
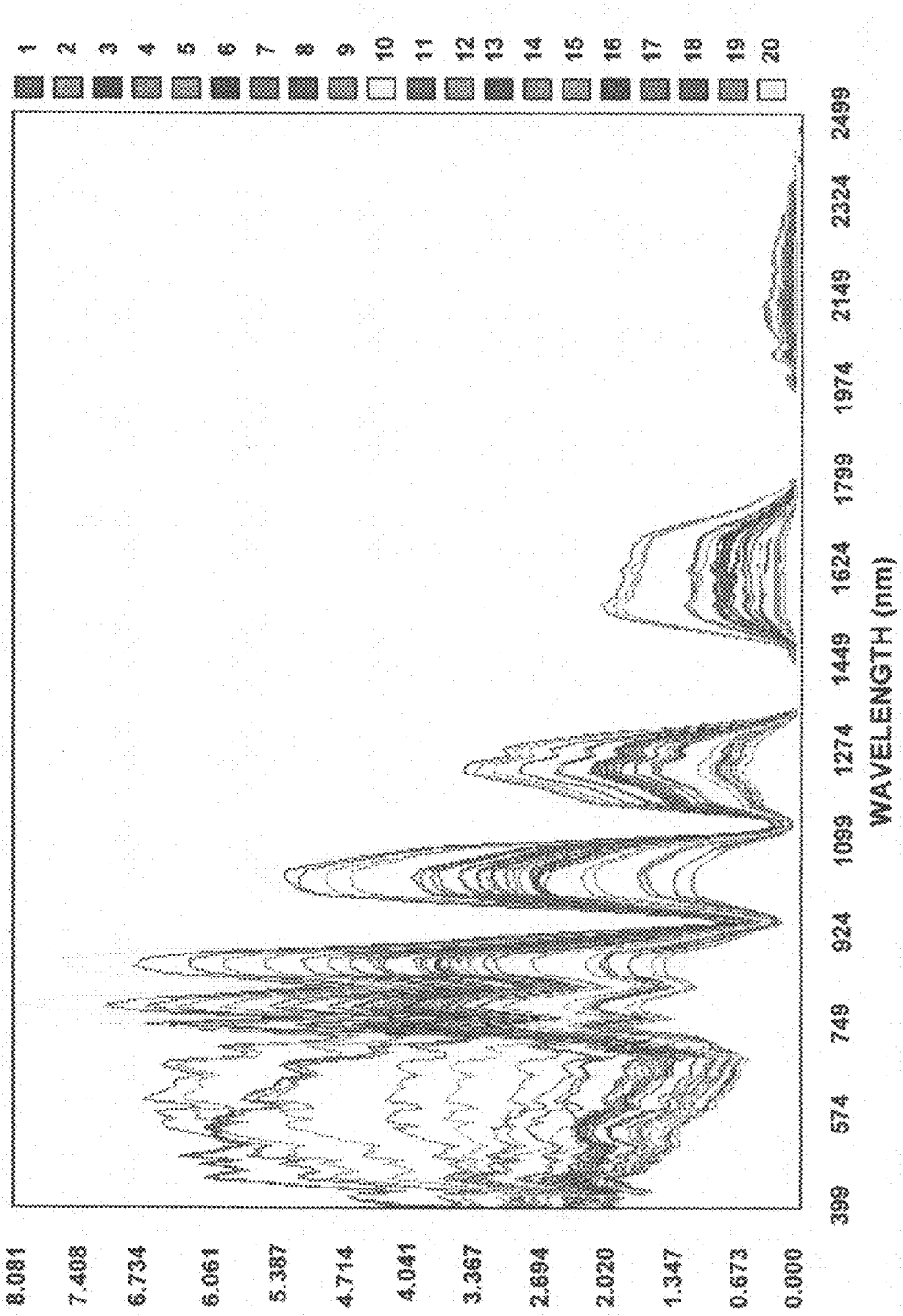
FIG. 1A is a color rendition of FIG. 1.

Refer to FIGS. 1 and 1A provided for illustration purposes only. FIG. 1 is a black and white version of the more readily discernible color FIG. 1A. Wavelength, nanometers (ηm), is plotted against radiance for most of the features in a hyperspectral data scene. Note that the reflectance values greater than 1799 ηm do not vary much, i.e., the spectral curve is flat with radiance values close to zero. Therefore, all ratios generated from bands between 1799 and 2500 ηm will provide essentially the same information and one ratio computation within any of these bands is sufficient.

As noted above, inherent disadvantages of a hyperspectral data set are the vast amount of data and contiguous bands highly correlated due to close proximity within the electromagnetic spectrum. For example, ratios involving adjacent bands generally provide the same information as ratios within those bands separated by two or three bands.

Figure 2:
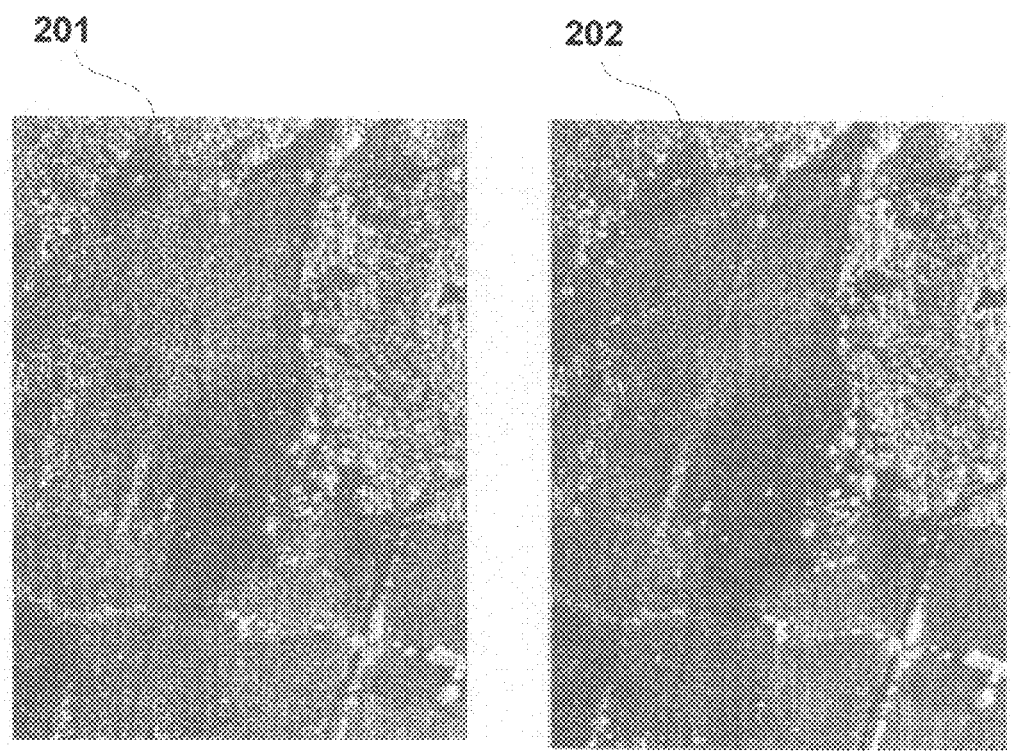
FIG. 2, provided for illustration purposes only, depicts two images generated with an embodiment of the present invention by using two different ratios from a hyperspectral data set.

Refer to FIG. 2 showing two images 201, 202 generated using two different ratios from a hyperspectral data set. The image 201 on the reader's left was generated from the difference between band 109, (wavelength 1437.3 ηm) and band 110, (wavelength 1451.1 ηm) and the image 202 on the reader's right generated from the difference between band 109 and band 111 (wavelength 1464.9 ηm). The two images 201, 202 appear almost identical so both are likely to provide the same information. The similarity between these images 201, 202 suggests that computing and analyzing ratios involving adjacent bands and ratios involving bands separated by two bands yield the same information, so computation of ratios separated by two bands is sufficient in this case.

Another factor that reduces the number of ratios needed, is the number of features in a hyperspectral scene. Normally the number of features of interest is less than the total number of features in the scene. Thus, in many situations most features of interest are extracted employing the analysis of but a few band ratios.

Unlike the work to derive either VI or NDVI in which the user is interested mostly in the numerical value of a ratio, in select embodiments of the present invention, the image display of the resulting ratio data is desired. Thus, of interest is the numerator of the NDVI approaching zero (0) for a particular vegetation feature, such as trees. This occurs when the radiance of the spectra of this pre-specified feature, e.g., trees, is the same for two different wavelengths, i.e., the difference in radiance equals zero, and the radiance of all other features in the dataset are different (non-zero) at these wavelengths. If these conditions are true and the resulting dataset is displayed as an image, the pixels for the trees will appear black and all other pixels a shade of gray. It is then easy to identify the trees in the image. The converse is also useful. If the radiance of the spectra for the trees is different in two wavelengths and the radiance of the spectra for all other features is the same in the same two wavelengths, then the image data will appear with the trees a shade of gray and all other features as black. The numerator does not have to vanish totally, but as long as there is separation in radiance between one feature and all the other features, then that one feature may be extracted easily.

A Generalized Difference Feature Index (GDFI), computed using Daubechies wavelets, automatically generates a large sequence of generalized band ratio images.

Ordinary band ratio methods for the ready identification of vegetation, cloud cover, and other features, usually take the difference of two bands divided by their sum. For example, for bands 5 and 7, in LANDSAT® multi-spectral imagery the NDVI for each pixel in the image is computed by:

$$NDVI = \frac{(z_7 - z_5)}{(z_7 + z_5)} \quad (5)$$

where $z_i$, $1 \leq i \leq 7$, corresponds to the spectral signature of the image. By scaling each of the terms in the numerator and denominator by $$\frac{1}{\sqrt{2}},$$

the ratio of Haar's wavelet high frequency content over its low frequency content is computed. That is, for Eqn. (5):

$$NDVI = \frac{\left(\frac{z_7}{\sqrt{2}} - \frac{z_5}{\sqrt{2}}\right)}{\left(\frac{z_7}{\sqrt{2}} + \frac{z_5}{\sqrt{2}}\right)} \quad (6)$$

This can be considered a first order scaled derivative. The data produced by applying this ratio accentuates discontinuities and suppresses slowly-varying data within a spectral signature.

At any pixel, Eqn. (6) may be generalized by applying the ratio throughout the components of the spectral signature, z, yielding a simplified relationship describing the Generalized Difference Feature Index (GDFI) of the present invention, $$GDFI_2(i, t) = \frac{h_0 z_i + h_1 z_{i+t}}{g_0 z_i + g_1 z_{i+t}} \quad (7)$$

where:
i refers to band i of a data collector such as LANDSAT®,
t is the lag between bands, i.e., number of bands skipped
$h_0, h_1$ are the high frequency coefficients
$g_0, g_1$ are the low frequency coefficients, and in particular
$h_0 = 1/\sqrt{2}$, $h_1 = -1/\sqrt{2}$, $g_0 = 1/\sqrt{2}$, and $g_1 = 1/\sqrt{2}$ The subscript 2 in $GDFI_2$ refers to the number of filter coefficients used in the ratio. For example, using LANDSAT® imagery yields the NDVI by:

$$NDVI = -GDFI_2(5,2) \quad (8)$$

where for LANDSAT® imagery conventionally used to yield the NVDI, i is 5 (Band 5) and t, lag, is 2 such that the difference between Bands 7 and 5 is divided by the sum of Bands 5 and 7 to yield the NDVI.

The method may be further generalized to include other wavelet coefficients with a higher number of vanishing moments. A natural extension of Eqn. (7) accounts for more filter coefficients, such as Daubechies high and low frequency filter coefficients. Eqn. (7) can be written as:

$$GDFI_{2n}(i, t) = \frac{h_0 z_i + h_1 z_{i+t} + \ldots + h_{(2n-1)} z_{i+(2n-1)t}}{g_0 z_i + g_1 z_{i+t} + \ldots + g_{(2n-1)t} z_{i+(2n-1)t}} \quad (9)$$

where n corresponds to the number of vanishing moments of the wavelet. Thus, In select embodiments of the present invention, the ratio method is employed for feature extraction (identification) and classification and a procedure for data mining is used therewith as described below in a flowchart that represents a process used in a select embodiment of the present invention.

Daubechies maxflat filters comprise an even number of coefficients where the high frequency filters satisfy n vanishing moments according to:

$$h_o * 0^k + h_1 * 1^k + \ldots + h_{2n-1}*(2n-1)^k = 0 \quad (10)$$

and the low frequency coefficients, g, satisfy:

$$g_o + g_1 + \ldots + g_{2n-1} = \sqrt{2} \quad (11)$$

for $0 \leq k \leq n-1$.

Eqns. (10) and (11) establish the criteria that a wavelet's high frequency, $h_k$, and low frequency, $g_k$, coefficients must satisfy to form a wavelet. For example, Eqn. (10) for a wavelet with three (3) vanishing moments, i.e., n=3, would be written as three separate expressions:

$$h_0*0^0 + h_1*1^0 + h_2*2^0 + h_3*3^0 + h_4*4^0 + h_5*5^0 = 0 \text{ (zero moment, or k=0)} \quad (10a)$$

$$h_0*0^1 + h_1*1^1 + h_2*2^1 + h_3*3^1 + h_4*4^1 + h_5*5^1 = 0 \text{ (first moment, or k=1)} \quad (10b)$$

$$h_0*0^2 + h_1*1^2 + h_2*2^2 + h_3*3^2 + h_4*4^2 + h_5*5^2 = 0 \text{ (second moment, or k=2)} \quad (10c)$$

$0^0$ is undefined, but for this case it is equal to 1.

These coefficients, $g_k$ and $h_k$, are used to compute the GDFI (generalized ratios) of derived bands (indices) as defined in Eqn. (9). The sequence of GDFI "bands" is then used to identify features of interest in a scene, for example. Individual GDFI bands are linked to specific features of interest and, once linked, are used to quickly and efficiently process data to "identify" or "highlight" only those features of interest.

A desired image with specific features "highlighted" is provided by employing a specific GDFI band(s) ratio and multiplying it by an appropriate constant, such as the Daubechies coefficients. In select embodiments of the present invention, a feature or features becomes very bright, e.g., appearing as a distinct color or shade lighter than the remainder of the image. Of course, an increase in the number of band ratios in the image increases the complexity of the image with a concomitant need for higher coefficients, i.e., higher order wavelets. Thus, there is a limit at which so many of the pixels are highlighted as to make the image no more valuable than the original unmodified image. Thus, it is appropriate to employ the least ordered wavelet that enables a select few features to be readily identified.

Vanishing moments are related to scaled derivatives. Mallat, S., *A Wavelet Tour of Signal Processing*, Academic Press, San Diego, Calif. 1998. Due to the wavelets' higher number of vanishing moments, as with Eqn. (5), this technique will suppress slowly varying regions of the image or higher-order polynomials in the spectra while also accentuating discontinuities. Bosch et al. note that for a fixed value of the lag, t, the sum of the squares of the numerator of Eqn. (9) scaled by $$\frac{1}{(m-(2n-1)t)}$$

for all values of i, corresponds to the data-mining wavelet-variogram function $\hat{\gamma}(t)$ such that:

$$\hat{\gamma}(t) = \frac{1}{(m-(2n-1)t)} \sum_{i=1}^{m-(2n-1)t} [h_0 z_i + h_1 z_{i+t} + \ldots h_{2n-1} z_{i+(2n-1)t}]^2 \quad (12)$$

where:
m is the number of spectral bands in the data set,
n is the number of vanishing moments in the filter wavelet, and
t is the lag.

Bosch, E. H., M. A. Oliver and R. Webster, *Wavelets and the Generalization of the Variogram*, Mathematical Geology, Volume 36, No. 2, pages 147-186, February 2004.

The experimental variogram, $\hat{\gamma}(t)$, as used in geostatistics, is obtained when n=1 (Haar wavelet filter). The experimental variogram, $\hat{\gamma}(t)$, analyzes spatial properties of data at different scales.

The GDFI$_{2n}$ is applied as a data mining technique to expose (identify) features of interest. The resulting generalization produces band ratios that depend on the number of spectral bands, the lag parameter, and the length of the Daubechies maxflat filter. Through employing the band ratio images as a data-mining tool one is able to rapidly display (identify) those pre-specified features enhanced by an embodiment of the present invention. The desired pre-specified features may be viewed as grayscale images but, as with images displayed using the NDVI, color composites may also be formed using an embodiment of the present invention. Hyperspectral imagery provides more flexibility, given the availability of a higher number of spectral bands. This is why embodiments of the present invention apply the filtered ratios first and then display the images.

As with the experimental variogram, $\hat{\gamma}(t)$, this technique depends on the assumption that data points are regularly spaced, a generally valid assumption since spectral bands from the employed sensors approximate regular spacing.

EXAMPLE I

Data were collected with a Hyperspectral Digital Collection Experiment (HYDICE) airborne sensor. This sensor uses a 320×210 array with multiple gain regions to support imaging at 400-2500 ηm. The sensor is flown at 5000 to 25000 ft and achieves spatial resolution of about 0.8 to 4 m. Basedow, R. W., D. C. Carmer, and M. E. Anderson, *Hydice: Operational Status*, Proceedings of the SPIE, Vol. 2480, May 1994.

Figure 3:
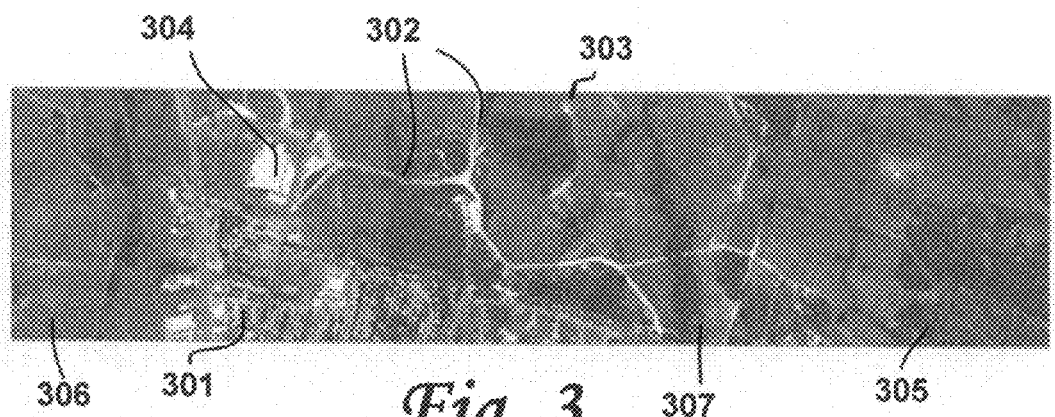
FIG. 3 depicts a standard HYDICE hyperspectral composite class map of the area around Copperas Cove, Tex.
Figure 3A:
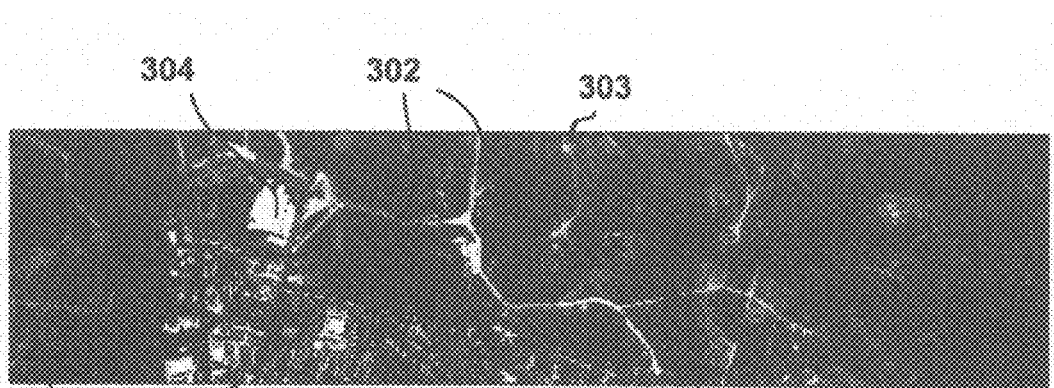
FIG. 3A is a color rendition of FIG. 3.

Data were collected over Copperas Cove, Tex. and the neighboring vicinity. The aircraft flew at an altitude of 20,000 ft to provide a spatial resolution of three (3) meters in 210 spectral bands from 398.5-2499.2 ηm. Twelve (12) features were identified in the hyperspectral scene: buildings 301, roads 302, soil 303, rooftops 304, canvas (not shown separately), rubber (not shown separately), metal (not shown separately), shrubs 305, plastic, grass 306, trees 307, and calibration panels (not shown separately). Refer to FIG. 3 depicting the hyperspectral composite class map of the Copperas Cove area in gray scale and to FIG. 3A showing the same composite class map in color.

EXAMPLE II

Figure 4:
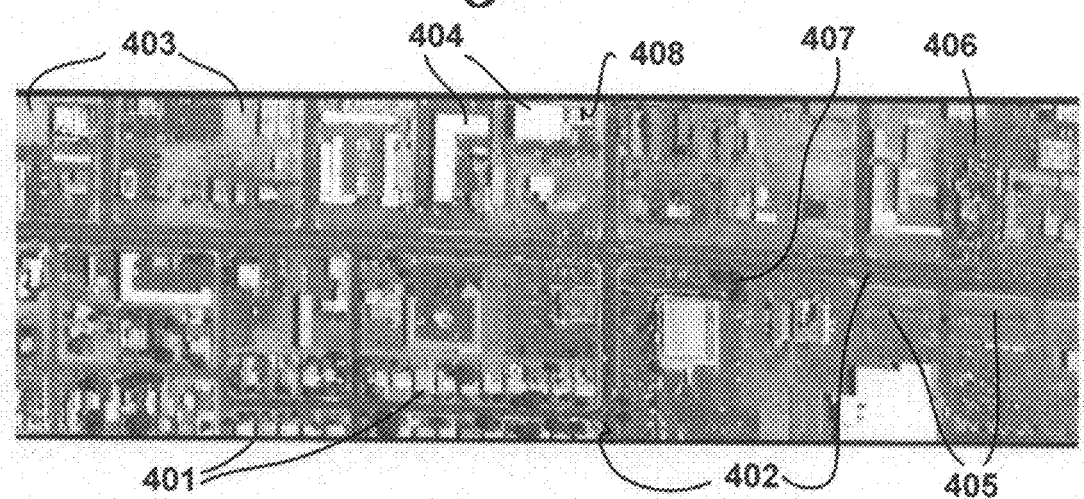
FIG. 4 depicts a standard HYDICE hyperspectral composite class map of the area around Yuma City, Ariz.
Figure 4A:
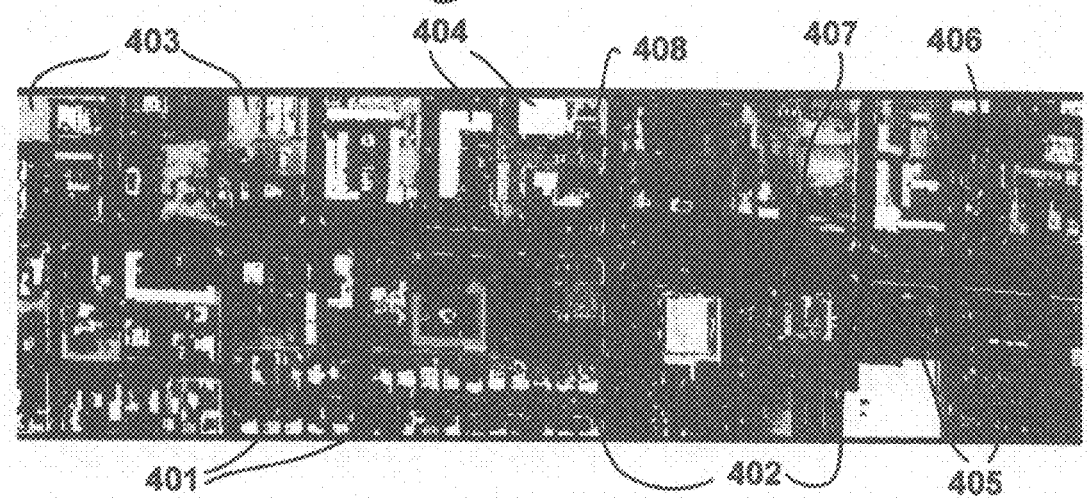
FIG. 4A is a color rendition of FIG. 4.

Data were also collected over Yuma City, Ariz. The aircraft flew at an altitude of 5000 ft to provide a spatial resolution of one (1) meter in the same number of bands as in Example 1. However, for this example only 204 bands were employed to image. These data are not calibrated. Eight (8) features were identified in the scene including: buildings 401, roads 402, soil 403, rooftops 404, shrubs 405, grass 406, trees 407, and swimming pools 408. FIG. 4 is a grayscale composite of the imaged area while FIG. 4A is the same Yuma City composite in color.

In the data sets for Examples I and II the interval between bands is not constant. Table I below summarizes the first three (3) and last five (5) wavelengths measured for each data set. The plot of the wavelength interval for Copperas Cove is a monotonic curve starting with an approximate interval of 3.3 and increasing to about 8.3 ηm. The same plot for Yuma City data is a step function with the interval a constant amount for several wavelengths followed by a jump. The two data sets are different although both were collected with the same sensor. The adjacent bands of each data set, even with the jump in the Yuma City data, are reasonably close enough to preclude any discontinuity problems.

TABLE 1

Band and Interval Relationship for Two Sites.

| | COPPERAS COVE | | | YUMA CITY | |
|---|---|---|---|---|---|
| Band No. | Wavelength (ηm) | Interval (ηm) | Band No. | Wavelength (ηm) | Interval (ηm) |
| 1 | 398.544 | 3.296 | 1 | 460.000 | 6.0 |
| 2 | 401.840 | 3.306 | 2 | 464.000 | 6.0 |
| 3 | 405.146 | 3.334 | 3 | 468.000 | 6.0 |
| 206 | 2466.270 | 8.270 | 200 | 2230.000 | 19.0 |
| 207 | 2474.540 | 8.250 | 201 | 2249.000 | 9.0 |
| 208 | 2482.790 | 8.209 | 202 | 2258.000 | 9.0 |
| 209 | 2491.000 | 8.169 | 203 | 2267.000 | 9.0 |
| 210 | 2499.169 | — | 204 | 2276.000 | — |

Several pre-specified desired features were extracted (identified) from scenes by using an embodiment of the present invention. Daubechies filtering wavelets with two (2), four (4) and eight (8) filter coefficients were used to generate numerous "difference-sum ratios." Thesholding was applied to separate the pre-specified features from the rest of the image and produce a binary image. Normally, thresholding is not amenable to automated computation. Thus, the threshold value is manually adjusted until a satisfactory result is obtained. Alternatively, thresholding is done by employing some statistical measure, such as a standard deviation from a class mean. Both of these thresholding methods can be time-consuming.

Figure 5:
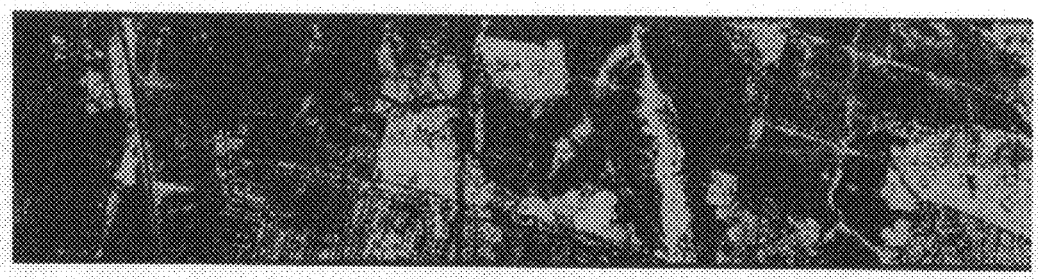
FIG. 5 depicts a first enhanced image of FIG. 3 generated with an embodiment of the present invention to emphasize vegetation, but not grass.
Figure 5A:
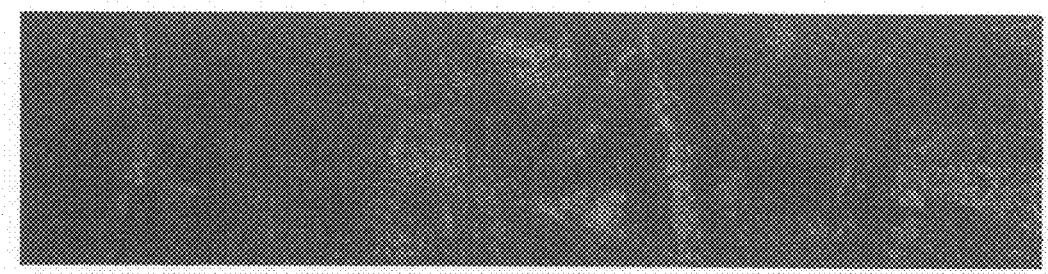
FIG. 5A is a color rendition of FIG. 5.

Refer to FIG. 5, an "enhanced" grayscale image of FIG. 3 and its color rendition FIG. 5A, generated from Eqn. (9) where n=1, i=17, and t=6. These values equate to the difference-sum ratio of bands 17 and 23 employing Daubechies wavelets and two (2) filter coefficients. FIG. 5 has been remapped with histogram equalization for better visual display. The light gray shading (green in FIG. 5A) represents vegetation consisting of trees, shrubs, and bushes, but no grass. This is consistent with ground truth information and with the same scene as represented in FIGS. 3 and 3A. The very dark areas represent trees, shrubs, bushes or a combination thereof.

Figure 6:
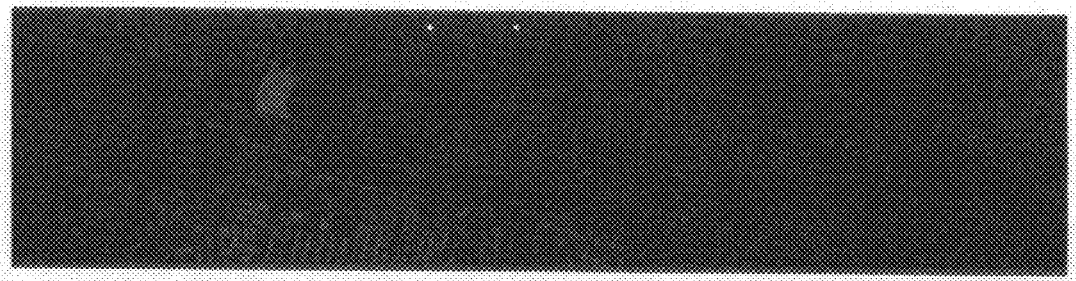
FIG. 6 depicts a second enhanced image of FIG. 3 generated with an embodiment of the present invention to emphasize buildings.
Figure 6A:
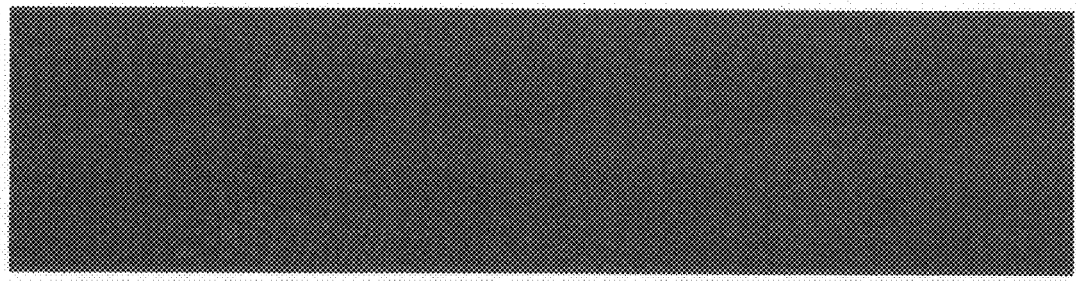
FIG. 6A is a color rendition of FIG. 6.

Refer to FIG. 6, an "enhanced" gray scale image of FIG. 3 and its color rendition FIG. 6A, generated from Eqn. (9), where n=1, i=120, t=9. These values equate to the difference-sum ratio of bands 120 and 129 employing Daubechies wavelets and two (2) filter coefficients. The light shaded areas (blue in a color rendition) represent buildings. These buildings correlate very well with the buildings identified in FIG. 3 and with ground truth. Buildings are not a detectable class in hyperspectral classification, but in this case all the light colored pixels have some commonality. One possibility is a delicate combination of asphalt rooftops with just enough paint to exclude asphalt parking lots and roads.

Figure 7:
FIG. 7 depicts a third enhanced image of FIG. 3 generated with an embodiment of the present invention to emphasize grass.
Figure 7A:
FIG. 7A is a color rendition of FIG. 7.

Refer to FIG. 7, an "enhanced" gray scale image of FIG. 3 and its color rendition FIG. 7A, generated from Eqn. (9) where n=1, i=153, t=6. These values equate to the difference-sum ratio of bands 153 and 159 employing Daubechies wavelets and two (2) filter coefficients. The light shading (light yellowish brown in FIG. 7A) represents the grass shown in FIG. 3. At three (3) meter-resolution most of the pixels are not homogeneous but may be a mix of grass, leaves, topsoil, and some tree branches in different combinations.

Figure 8:
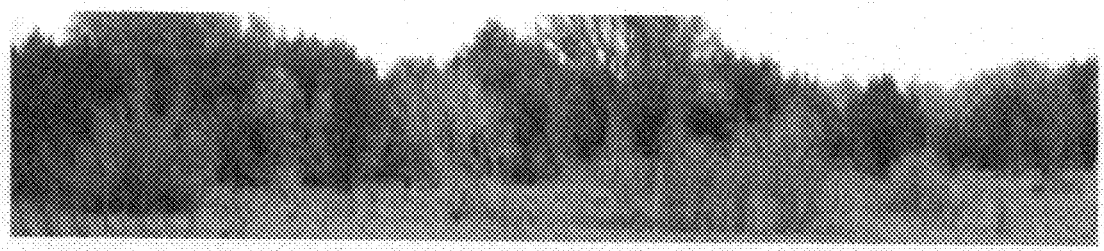
FIG. 8, shown for illustrative purposes only, is a ground truth photo of a typical grassy area in Copperas Cove.
Figure 8A:
FIG. 8A is a color rendition of FIG. 8.

Refer to FIG. 8, gray scale ground truth photo of a typical grassy area of FIG. 3 and FIG. 8A, a color rendition of FIG. 8. These grassy areas, as depicted in FIGS. 8 and 8A, are a mix of low growing vegetation, grass, branches, and soil.

Figure 9:
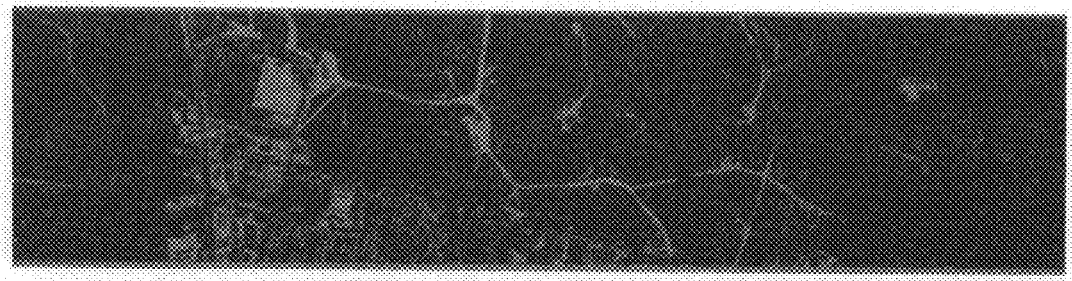
FIG. 9 depicts a fourth enhanced image of FIG. 3 generated with an embodiment of the present invention to emphasize dirt roads, concrete, and bright rooftops.
Figure 9A:
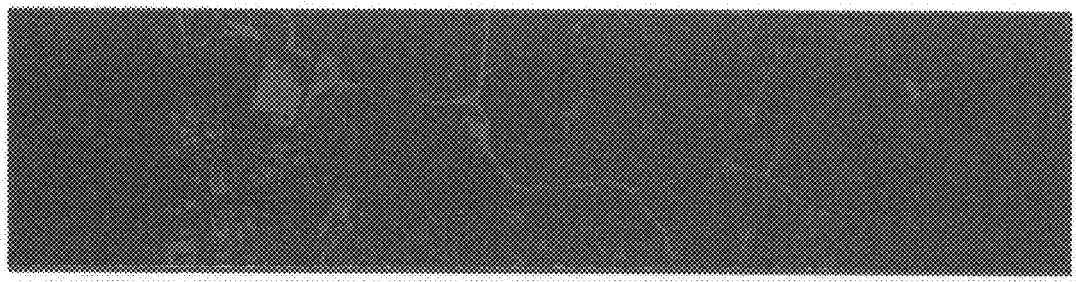
FIG. 9A is a color rendition of FIG. 9.

Refer to FIG. 9, an "enhanced" grayscale image of FIG. 3 and its color rendition FIG. 9A, generated from Eqn. (9) where n=1, i=18, t=5. These values equate to the difference-sum ratio of bands 18 and 23 employing Daubechies wavelets and two (2) filter coefficients. The light shading (red in FIG. 9A) represents dirt roads, concrete, and bright rooftops of the scene from FIG. 3. The complex constitution of some roads, e.g., debris, tire marks, and the like may cause some roads to appear to have disconnected segments.

Figure 10:
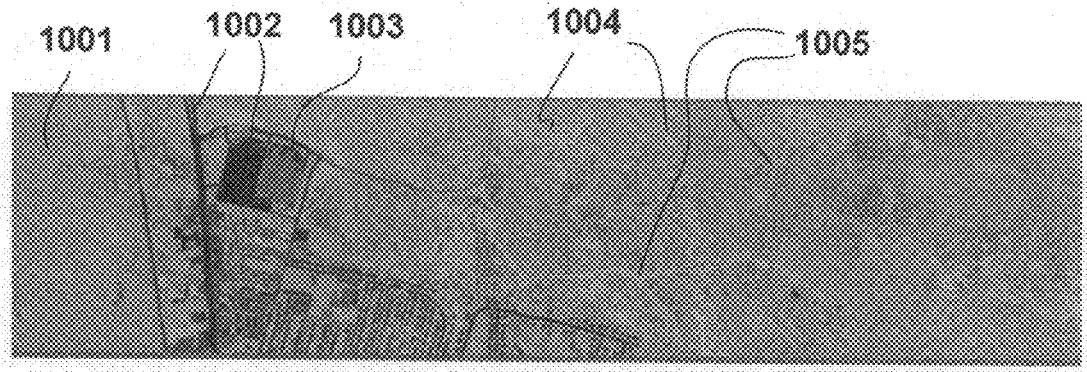
FIG. 10 depicts a class map of FIG. 3, generated from data used to create FIGS. 5, 6, 7, and 9.
Figure 10A:
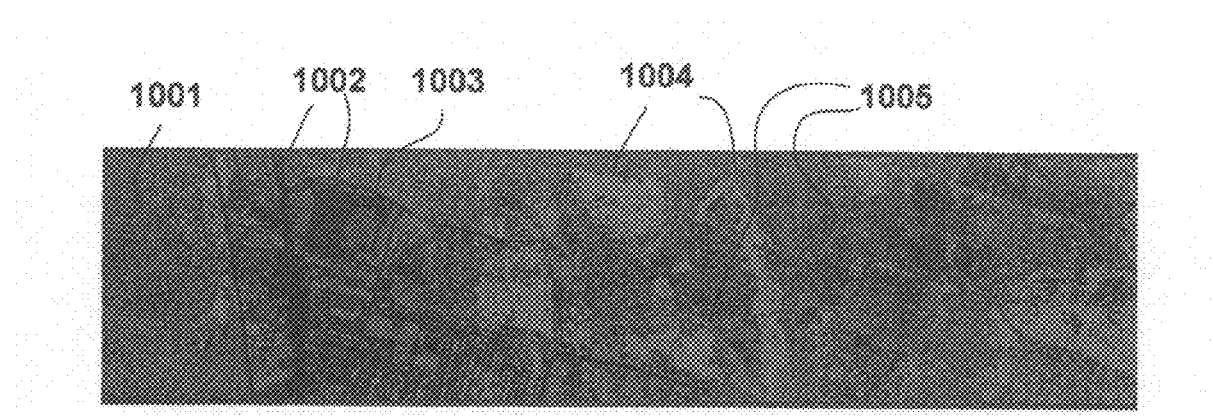
FIG. 10A is a color rendition of FIG. 10.

Refer to FIG. 10, an "enhanced" grayscale image of FIG. 3 and its color rendition FIG. 10A, a classification ("class") map of Copperas Cove, generated from data used to create FIGS. 5, 6, 7, and 9 and their respective color renditions, FIGS. 5A, 6A, 7A, and 9A. No attempt was made to optimize color, but this can be done. In the color rendition of FIG. 10A, the major features are well separated, viz., trees, shrubs and bushes 1004 (FIG. 10) are green, dirt roads 1005 (FIG. 10) are orange, grass and soil 1001 (FIG. 10) are brownish, and asphalt 1002 (FIG. 10) is black. Purple pixels represent bright rooftops 1003 (FIG. 10). There are some pixels that did not get classified, but most of them are sparsely scattered throughout the image and most are probably mixed pixels such as those that may represent mixed vegetation, i.e., a mix of topsoil, grass, trees, shrubs, and bushes. There may be other features that could be extracted (identified), e.g., swimming pools, but they are too small to be clearly identified in the image of FIGS. 4 and 4A.

Ground truth at Copperas Cove provided five (5) other features: rubber, plastic, metal, canvas, and calibration panels. These were not clearly identified with an embodiment of the present invention. All these features, however, are very small in size and in number and are very challenging to detect under any circumstances. Calibration panels are detectable, but they are so small that it is not possible to conclusively identify them and normally these pixels are dismissed as artifacts.

Figure 11:
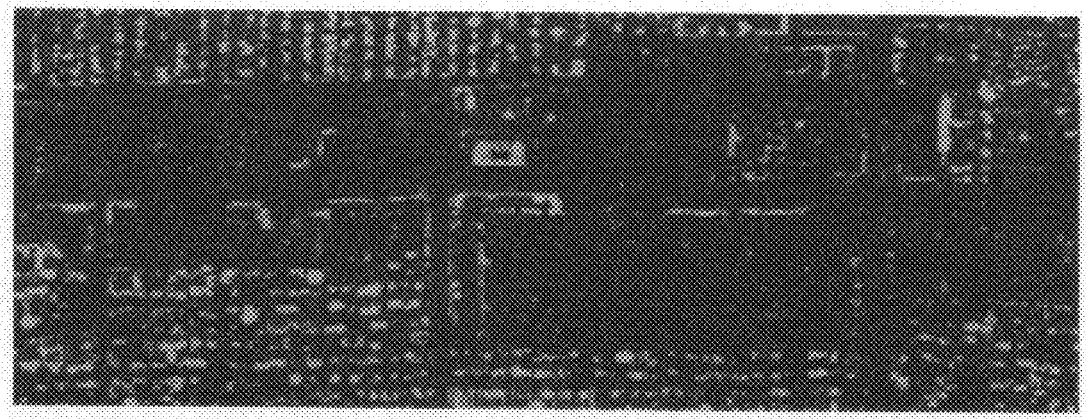
FIG. 11 depicts a first enhanced image of FIG. 4 generated with an embodiment of the present invention to emphasize vegetation such as trees, shrubs, bushes, and grass.
Figure 11A:
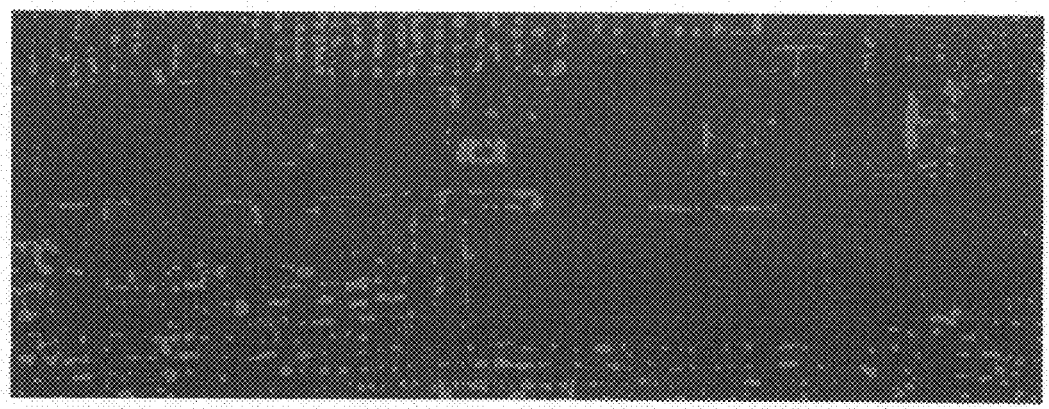
FIG. 11A is a color rendition of FIG. 11.

Refer to FIG. 11, an "enhanced" grayscale image of FIG. 4, and its color rendition FIG. 11A, generated from Eqn. (9), where n=2, i=26, and t=16. The relevant bands are 26, 42, 58, and 74 with Daubechies wavelets, four (4) filter coefficients and thresholding. The light shaded portions of FIG. 11 and the corresponding green of FIG. 11A, represent trees, shrubs, bushes, and grass. The trees, shrubs, bushes, and grass in the image correlate very well with FIG. 4 and with ground truth, given that FIGS. 11 and 11A are not exact duplicate representations of the area of FIG. 4, i.e., they correlate to only a part of the area of FIG. 4.

Figure 12:
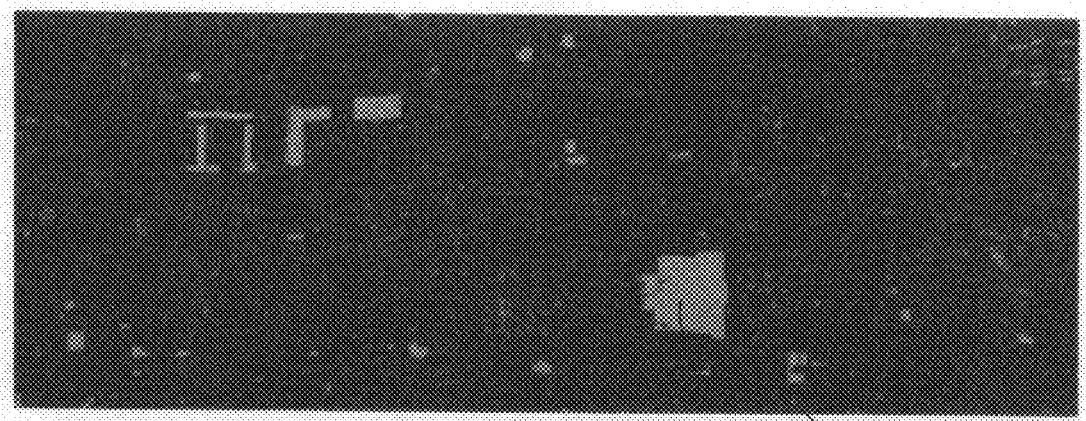
FIG. 12 depicts a second enhanced image of FIG. 4 generated with an embodiment of the present invention to emphasize cars, parked and moving, and colored rooftops having some commonality with automotive paint.
Figure 12A:
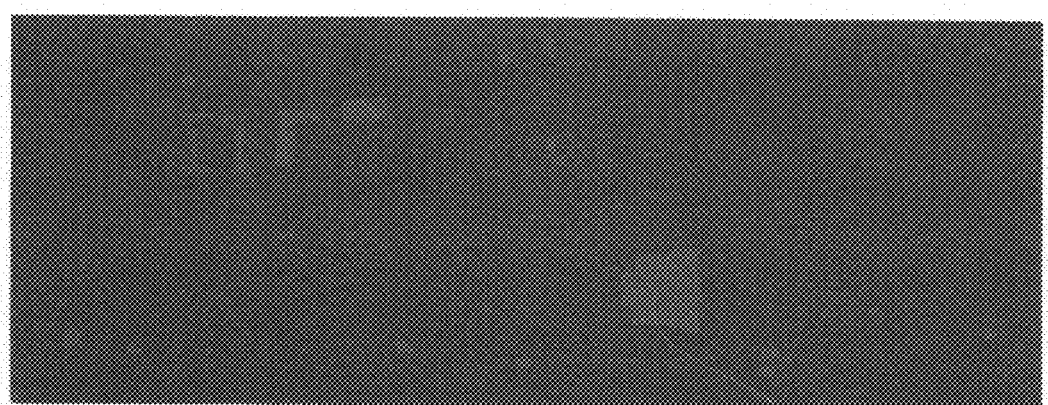
FIG. 12A is a color rendition of FIG. 12.

Refer to FIG. 12, an "enhanced" grayscale image of FIG. 4, and its color rendition FIG. 12A, generated from Eqn (9) where n=2, i=135, and t=16. The relevant bands are 135, 151, 167, and 183 with Daubechies wavelets, four (4) filter coefficients, and thresholding. The small light-shaded signatures of FIG. 12 (blue signatures in the color rendition of FIG. 12A) represent parked and moving vehicles, and the larger light-shaded signatures of FIG. 12 (blue signatures in the color rendition of FIG. 12A) are rooftops that have some commonality with automotive paint. The large solid signature 1201 (FIG. 12) is a commercial building having an asphalt rooftop with some metallic paint on it. Ground truth verified that the other light-shaded signatures (blue signatures in the color rendition of FIG. 12A) have painted surfaces. Not all the vehicles in the scene have been extracted (identified) because different color shades have substantially different spectra. Vehicles and rooftops are not considered to constitute a unique, independent class in hyperspectral classification unless all have identical surface paint. The spectral response for wood and metal painted the same color is very nearly the same. Evans, T., P. Henley, and E. Gonzalez, *Desert Radiance II: Supplemental Report,* submitted to Hyperspectral MASINT Support to Military Operations (HYMSMO) Program Office, October 1995.

Figure 13:
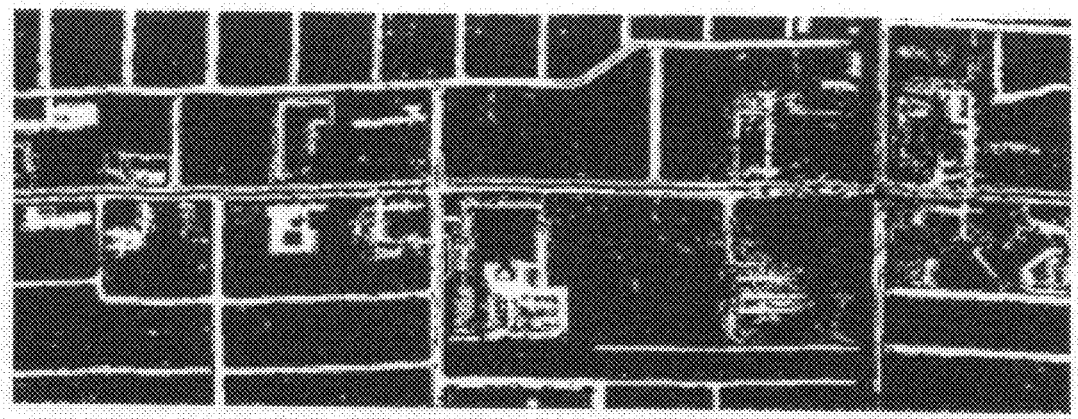
FIG. 13 depicts a third enhanced image of FIG. 4 generated with an embodiment of the present invention to emphasize roads and parking lots.
Figure 13A:
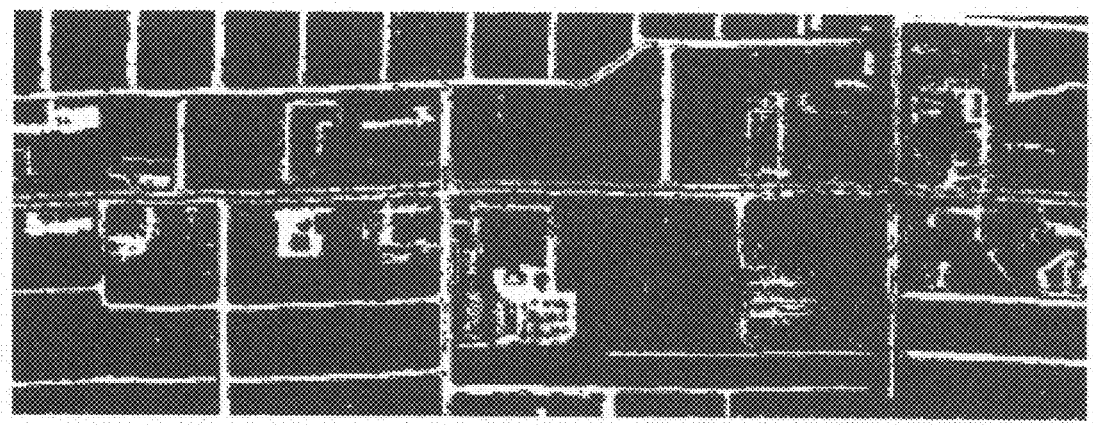
FIG. 13A is a color rendition (no gray scale) of FIG. 13.

Refer to FIG. 13, an "enhanced" grayscale image of FIG. 4, and its color (no gray scale) rendition FIG. 13A, generated from Eqn. (9) where n=1, i=15, t=16. These values equate to the difference-sum ratio of bands 15 and 31 employing Daubechies wavelets and two (2) filter coefficients. The white areas represent roads and parking lots of FIG. 4. The composition of roads and parking lots in this area is gravel, concrete, and asphalt in different combinations. All these materials have very similar spectral properties so that in most cases, roads, whether all one material or a combination of several, will appear the same. Evans et al. (1995). The white areas correlate well with the roads, parking lots, and some gravel covered or asphalt, not bright, rooftops of FIG. 4.

Figure 14:
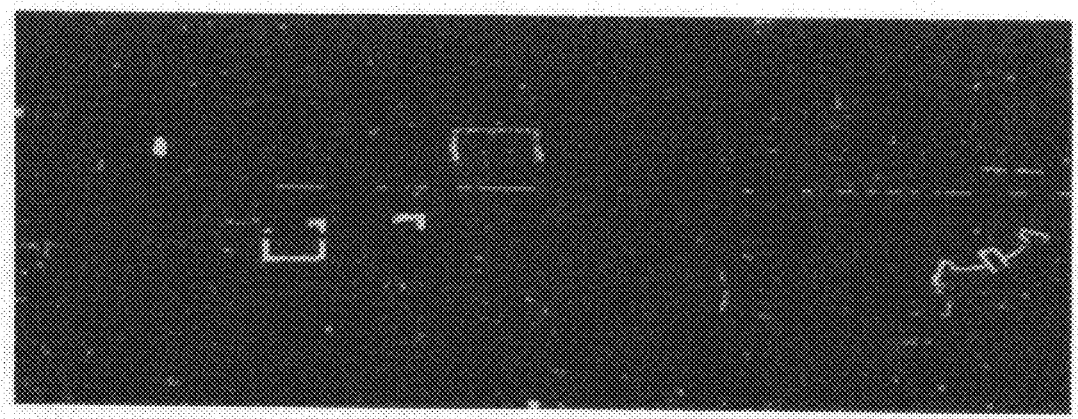
FIG. 14 depicts a fourth enhanced image of FIG. 4 generated with an embodiment of the present invention to emphasize painted surfaces of the same approximate color.
Figure 14A:
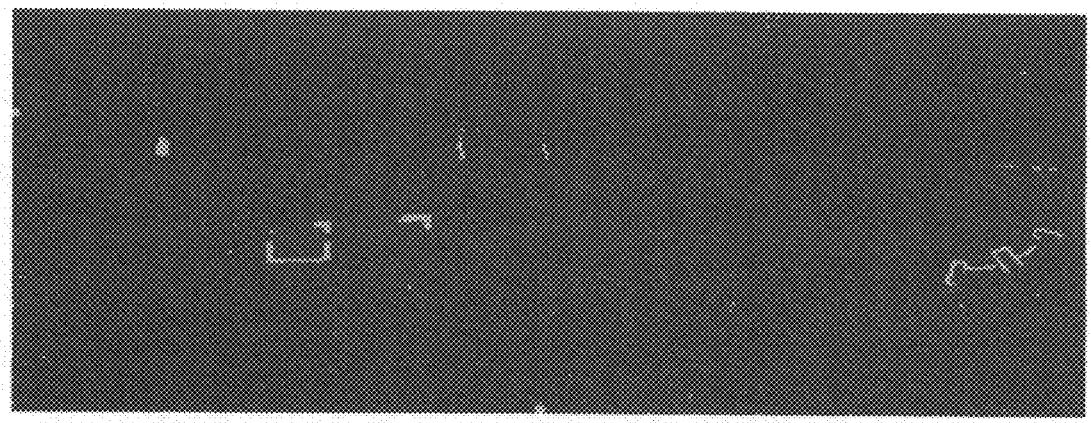
FIG. 14A is a color rendition of FIG. 14.

Refer to FIG. 14, an "enhanced" grayscale image of FIG. 4, and its color rendition FIG. 14A, generated from Eqn. (9) where n=1, i=32, t=6. These values equate to the difference-sum ratio of bands 32 and 38 employing Daubechies wavelets and two (2) filter coefficients. The light shaded areas (pink in the color rendition of FIG. 14A) represent surfaces painted the same color, e.g., roofing edges. Most of these surfaces are on rooftops and the small dots are vehicles. The horizontal broken line in both FIGS. 14 and 14A is an artifact.

Figure 15:
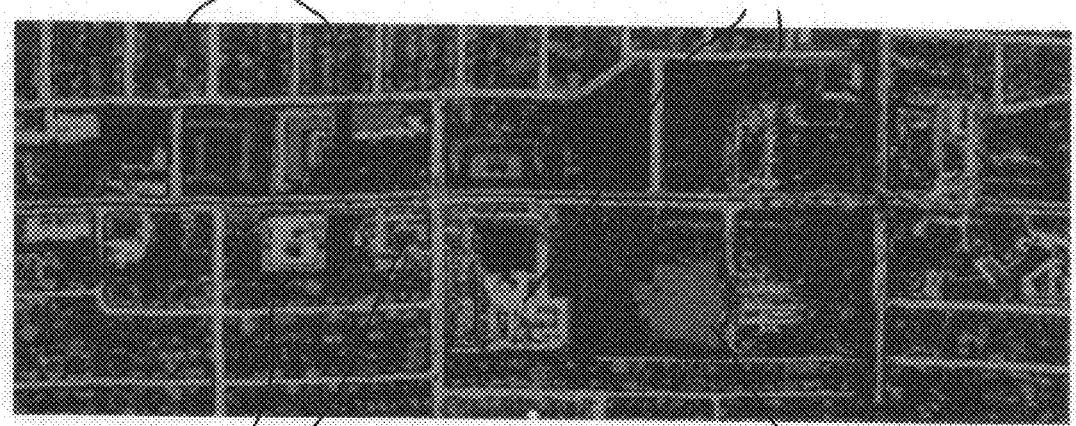
FIG. 15 depicts a class map of FIG. 4, generated from data used to create FIGS. 11, 12, 13 and 14.
Figure 15A:
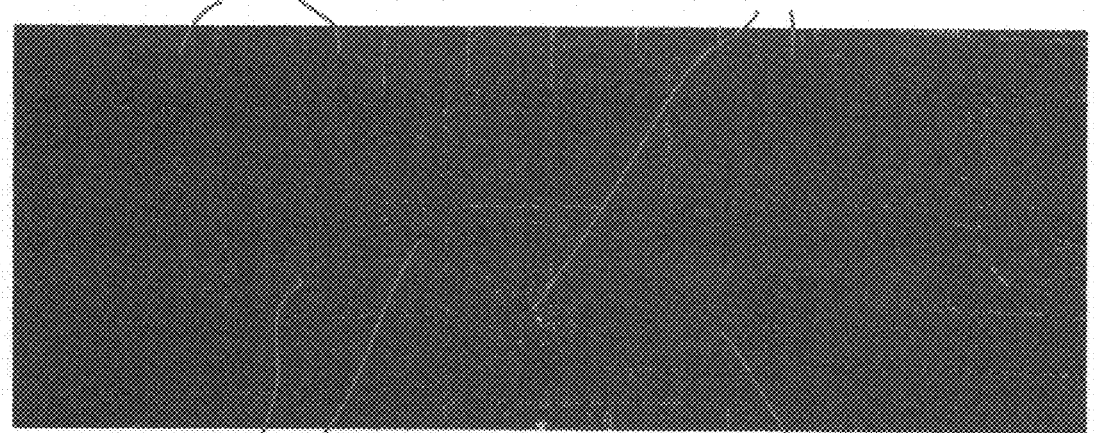
FIG. 15A is a color rendition of FIG. 15.

Refer to FIG. 15, an "enhanced" grayscale image and its color rendition FIG. 15A, FIGS. 15 and 15A represent a rudimentary class map of the Yuma City image of FIG. 4, generated from FIGS. 11, 12, 13, and 14 and 11A, 12A, 13A, and 14A, respectively. Vegetation 1501, including grass, is shown in green in the color rendition of FIG. 15A, roads, parking lots, and some rooftops 1502 are gray in FIG. 15A, colored rooftops 1503 are blue in FIG. 15A, colored sides of buildings 1504 are orange in FIG. 15A, and everything that was not classified is black in FIG. 15A.

A single pre-specified feature may be extracted (identified) with different combinations of bands. Table II below shows some features and the bands that were used for the extraction (identification) and associated wavelengths. The fourth column shows the number of coefficients used with the Daubechlies wavelet employed with this particular embodiment of the present invention. For example, D4 stands for Daubechies wavelets with four (4) filter coefficients. Lag is the interval between the bands, i.e., number of skipped bands, used in this embodiment of the present invention. The sequence of difference-sum ratio images generated with the same lag and same filter wavelet constitutes an image cube. Often all pre-specified features of interest may be extracted (identified) within one of these image cubes.

TABLE 2

Extracted (identified) Features

| Scene | Bands | Wavelengths (ηm) | Wavelet | Lag | Feature |
| --- | --- | --- | --- | --- | --- |
| Copperas Cove | 1/17 | 398.5/455.7 | D4 | 16 | Vegetation very dark |
| Copperas Cove | 7/23 | 418.6/481.0 | D4 | 16 | Swimming Pools very dark |
| Copperas Cove | 12/15 | 436.5/447.8 | D2 | 3 | Roads, parking lots, rooftops bright |
| Copperas Cove | 52/58 | 668.3/727.7 | D2 | 6 | Vegetation very bright |
| Yuma City | 81/88 | 1030.0/1134.0 | D4 | 7 | Roads, rooftops very bright |
| Yuma City | 90/97 | 1164.0/1267.0 | D4 | 7 | Vegetation very bright |
| Yuma City | 42/58 | 588.0/729.0 | D2 | 16 | Swimming pools very bright |
| Yuma City | 112/128 | 1480.0/1687.0 | D2 | 16 | Vegetation very bright |

EXAMPLE III

Figure 16:
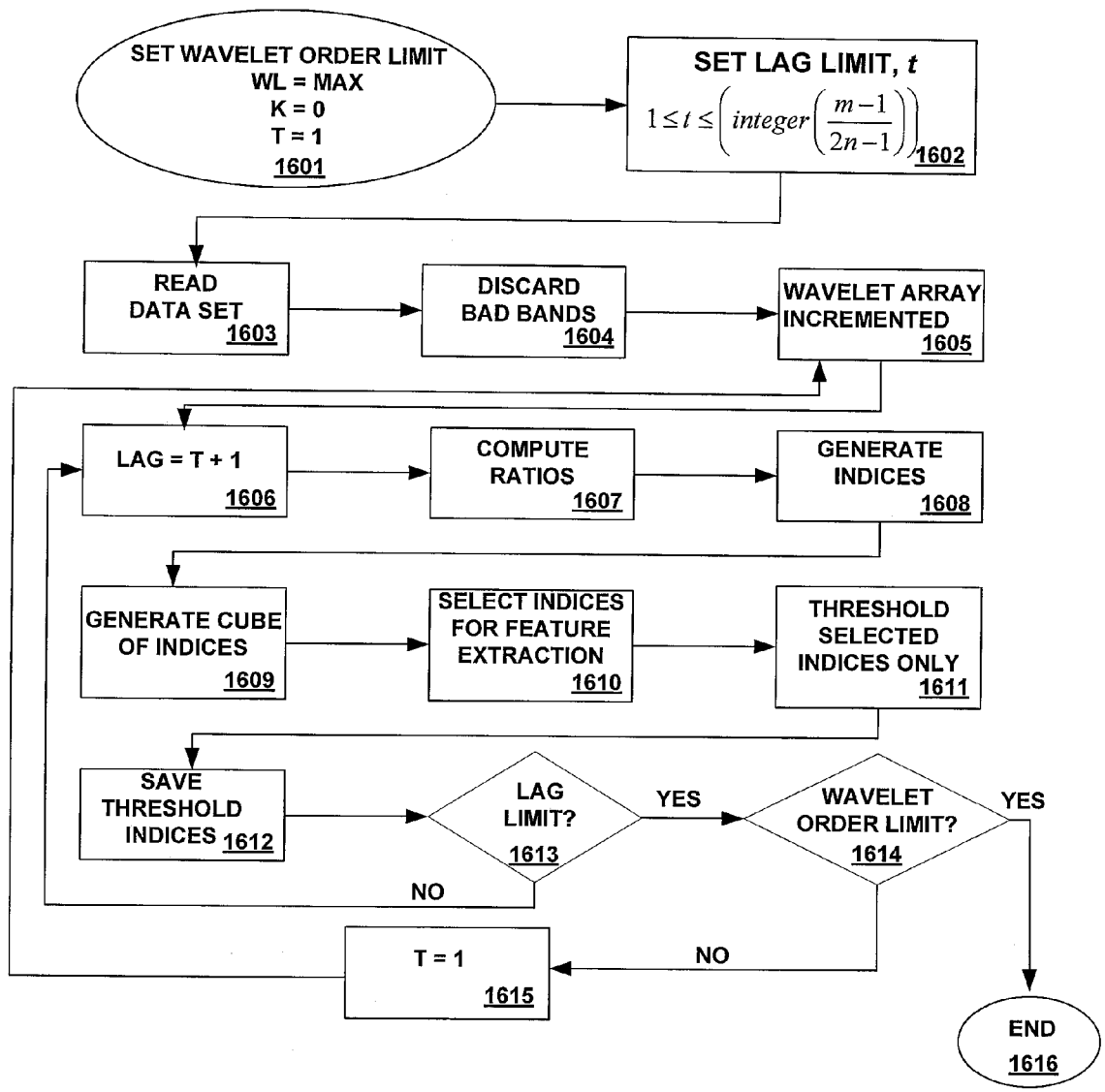
FIG. 16 is a flowchart representing a method of implementing data mining as used in select embodiments of the present invention.

Refer to FIG. 16, a sample flow diagram for a process used in select embodiments of the present invention to perform data mining to streamline the processing of hyperspectral data in those cases in which specific features are to be identified or highlighted. To start the process at a $1^{st}$ step 1601 the pre-specified limit of the wavelet array index, K, is selected and set and start values of wavelet array index, K, and lag, T, are set to zero and 1, respectively. Next at a $2^{nd}$ step 1602, the limit for lag is set. Having set these two limits, a $3^{rd}$ step 1603 involves reading in the hyperspectral data set. A $4^{th}$ step 1604 discards those bands that contain compromised (bad) data. (Although this step is taken early in the process to reduce the amount of data handled early on, "bad bands" would be eliminated at the $10^{th}$ step 1610 below in any case.) The wavelet array index, K, is then incremented appropriately in a $5^{th}$ step 1605. In a $6^{th}$ step 1606, the lag, T, is incremented by 1 and a 7 th step 1607 calculates the ratios that are appropriate to generate indices in an $8^{th}$ step 1608. A "cube" of the indices is generated in a $9^{th}$ step 1609 to provide the source from which indices for extracting specific features are selected in a 10 th step 1610. It is in $10^{th}$ step 1610 that the number of bands are reduced. It is possible to have started with hundreds of bands and after the $10^{th}$ step 1610, many derived bands are eliminated. One advantage of this process is that there is no need to determine if a band is "good" or "bad," just if that band is appropriate to identify the specified structure. In an $11^{th}$ step 1611, a threshold is applied and only those indices meeting the threshold are selected for further use. The thresholded indices are saved in a $12^{th}$ step 1612 and two limits are applied to them. In a $13^{th}$ step 1613, a lag limit is applied. The lag limit, t, is defined as $$1 \leq t \leq \left(\text{integer}\left(\frac{m-1}{2n-1}\right)\right) \quad (13)$$

Where:
 m=number of bands in the dataset, and
 n=number of vanishing moments.

If an index meets the lag limit, it is passed to $14^{th}$ step 1614 where a wavelet order limit is applied. Upon passing both the wavelet order and lag limits, the index is "approved" for the desired feature extraction and the process is ended 1616. If the lag limit is not met in a $13^{th}$ step 1613, the process is recycled to the $6^{th}$ step 1606, the lag is incremented by one and the process reiterated from $7^{th}$ step 1607 until once again reaching the $13^{th}$ step 1613 whereupon a determination of whether it meets the lag limit is made. This process is repeated until the lag limit is met at the $13^{th}$ step 1613 and then passed to a $14^{th}$ step 1614 to determine if the wavelet order limit is met. If the wavelet order limit is not met, the process goes to a $15^{th}$ step 1615 where the lag is reset to zero and the process iterated from $5^{th}$ step 1605 by incrementing the wavelet order by one and continuing the process to the $14^{th}$ step 1614 until the wavelet order limit is met at which time the process is ended 1616. This process reduces the number of bands to be considered, making the feature extraction process much more efficient than previously possible using more complex methods.

Under these conditions, and as another alternative embodiment, it is possible to use a standard computer suitably programmed to perform all these operations.

The convolution product in itself is a computation commonly performed in a computer with programs that exist in the market, and the sequence of successive processing operations may be obtained by adequate programming, wherein the intermediate results are stored in memory to be brought out again when they are necessary. In the same way, the coefficients of wavelets are placed in the central memory of the computer and, in the sequence of operations, there is provision for obtaining the product of convolution on the number of points needed for the rate of the analysis operation. Although the analog/digital conversion too can be done in the computer, it is nevertheless desirable to use a specialized circuit, which will be faster, for this function. It is also possible to use a specialized circuit to perform the convolution, here again for reasons of speed, since many micro-computers provide for the use of a co-processor associated with the microprocessor in order to make particular computations.

In sum, the band ratio method of select embodiments of the present invention reduces computation cost in classification and feature extraction tasks. The shear number of possible ratios is, as stated, enormous. Selective band utilization reduces them to a manageable number, although the introduction of wavelets may increase computations several fold. There are several more wavelets that may be employed with select embodiments of the present invention, such as Vaidyanathan, Coiflet, Beylkin, and Symmlet, among others.

The abstract of the disclosure is provided to comply with the rules requiring an abstract that will allow a searcher to quickly ascertain the subject matter of the technical disclosure of any patent issued from this disclosure. 37 CFR §1.72 (b). Any advantages and benefits described may not apply to all embodiments of the invention.

While the invention has been described in terms of some of its embodiments, those skilled in the art will recognize that the invention can be practiced with modifications within the spirit and scope of the appended claims. For example, although specific types of image processing are discussed, other similar configurations or methods, including those that may have only some of the constituents or steps used in the above examples, may be suitable for extracting (identifying) pre-specified features and thus fall within the ambit of a preferred embodiment of the present invention as provided in the claims herein.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

Thus, it is intended that all matter contained in the foregoing description or shown in the accompanying drawings shall be interpreted as illustrative rather than limiting, and the invention should be defined only in accordance with the following claims and their equivalents.

We claim:

1. An efficient method of data mining to facilitate ready identification of desired features within imagery data dispersed among multiple spectral bands, comprising:
   (a) selecting a wavelet type for use in said efficient method of data mining;
   (b) providing means for manipulating said data, said means at least further capable of implementing the algorithm, $$GDFI_{2n}(i, t) = \frac{h_o z_i + h_1 z_{i+t} + \ldots + h_{(2n-1)} z_{i+(2n-1)t}}{g_o z_i + g_1 z_{i+t} + \ldots + g_{(2n-1)t} z_{i+(2n-1)t}},$$

where
   $GDFI_{2n}(i, t)$ is a wavelet-based generalized difference feature index,
   i refers to wavelength band i of a data collector,
   t is a specified lag between wavelength bands,
   $h_0, h_1 \ldots h_{2n-1}$ are high frequency coefficients
   $g_0, g_1 \ldots g_{2n-1}$ are low frequency coefficients,
wherein, a number of said high and low frequency coefficients is determined upon establishing an order of a wavelet of said selected wavelet type,
   n is a specified number of vanishing moments of said selected wavelet type, and
   $z_i, z_{i+t} \ldots z_{i+(2n-1)t}$ are data necessary to yield at least one said wavelet-based generalized difference feature index from a spectral signature of an image;
   (c) establishing a set of wavelet-based generalized difference feature indices that may be generated later in said efficient method of data mining;
   (d) initiating at least one said means for manipulating data by setting a maximum wavelet order limit, selecting wavelength bands and setting K=0 and setting T=1, where
   K is a specified wavelet array index, and
   T is an incremented specified lag, defined as a specified number of said wavelength bands skipped between ones of said selected wavelength bands;
   (e) setting a lag limit defined as $$1 \leq t \leq \left(\text{integer}\left(\frac{m-1}{2n-1}\right)\right),$$

where m is a specified number of wavelength bands in a specified dataset;
   (f) reading at least one said data set comprising said wavelength in said specified dataset bands into said means for manipulating;
   (g) identifying and discarding said specified wavelength bands having compromised data;
   (h) incrementing said K;
   (i) incrementing said T by 1;
   (j) computing a reduced set of difference-sum wavelength band ratios;
   (k) generating at least one said established wavelet-based generalized difference feature index;
   (l) generating a cube of each said established wavelet-based generalized difference feature index;
   (m) selecting at least one of said established wavelet-based generalized difference feature indices;
   (n) thresholding said selected pre-specified established wavelet-based generalized difference feature indices,
wherein said thresholding results in only said selected pre-specified established wavelet-based generalized difference feature indices being used henceforth;
   (o) saving said thresholded selected pre-specified established wavelet-based generalized difference feature indices;
   (p) determining if said lag limit has been met;
   (q) if said lag limit has been met, determining if said maximum wavelet order limit has been met;
   (r) if said lag limit has not been met, performing another iteration of steps (h) through (r) until said lag limit has been met;
   (s) if said maximum wavelet order limit has been met, stopping; and
   (t) if said maximum wavelet order limit has not been met, setting said T=1 and performing another iteration of steps (h) through (t) until said maximum wavelet order limit has been met,
wherein, if both said lag limit and said maximum wavelet order limit have been met, said efficient method of data mining is ended, resulting in an efficient identification of said desired features in said imagery data.

2. The method of claim 1 said imagery data comprising hyperspectral data.

3. The method of claim 2 said hyperspectral data comprising wavelengths in the spectra from about 300 to about 900 nanometers.

4. The method of claim 2 said hyperspectral data comprising wavelengths in the spectrum of visible light.

5. The method of claim 1 said means for manipulating said data comprising software running on at least one specially programmed computer.

6. The method of claim 1 wherein, in the step of setting said maximum wavelet order limit, said maximum wavelet order limit is set at sixteen (16).

7. The method of claim 1 selecting said wavelet type from the group consisting of Daubechies, Vaidyanathan, Coiflet, Beylkin, and Symmlet Wavelets.

8. The method of claim 7 selecting said Daubechies Wavelet as said wavelet type.

9. An efficient method of data mining to facilitate ready identification of desired features within a multi-band data set, comprising:
 (a) selecting a wavelet type for use in said efficient method of data mining;
 (b) providing means for manipulating said data, said means configured to perform the algorithm, $$GDFI_{2n}(i, t) = \frac{h_o z_i + h_1 z_{i+t} + \ldots + h_{(2n-1)} z_{i+(2n-1)t}}{g_o z_i + g_1 z_{i+t} + \ldots + g_{(2n-1)t} z_{i+(2n-1)t}},$$

where
  $GDFI_{2n}(i, t)$ is a wavelet-based generalized difference feature index,
  i refers to band i of a data collector,
  t is a specified lag between bands,
  $h_0, h_1 \ldots h_{2n-1}$ are high frequency coefficients
  $g_0, g_1 \ldots g_{2n-1}$ are low frequency coefficients,
 wherein, a number of said high and low frequency coefficients is determined upon establishing an order of a wavelet of said selected wavelet type,
  n is a specified number of vanishing moments of said selected wavelet, and
  $z_i, z_{i+t} \ldots z_{i+(2n-1)t}$ are data necessary to yield at least one said wavelet-based generalized difference feature index from a spectral signature;
 (c) establishing a set of wavelet-based generalized difference feature indices that may be generated later in said efficient method of data mining;
 (d) initiating at least one said means for manipulating data by setting a maximum wavelet order limit, selecting bands and setting K=0 and setting T=1, where
  K is a specified wavelet array index, and
  T is an incremented a specified lag, defined as a specified number of said bands skipped between ones of said selected bands;
 (e) setting a lag limit defined as $$1 \leq t \leq \left(\text{integer}\left(\frac{m-1}{2n-1}\right)\right),$$

where m is a specified number of bands in a specified dataset;
 (f) reading at least one said data set comprising said bands in said specified dataset into said means for manipulating;
 (g) identifying and discarding said specified bands having compromised data;
 (h) incrementing said K;
 (i) incrementing said T by 1;
 (j) computing a reduced set of difference-sum band ratios;
 (k) generating at least one said established wavelet-based generalized difference feature index;
 (l) generating a cube of each said established wavelet-based generalized difference feature index;
 (m) selecting at least one of said established wavelet-based generalized difference feature indices;
 (n) thresholding said selected pre-specified established wavelet-based generalized difference feature indices, wherein said thresholding results in only said selected pre-specified established wavelet-based generalized difference feature indices being used henceforth;
 (o) saving said thresholded selected pre-specified established wavelet-based generalized difference feature indices;
 (p) determining if said lag limit has been met;
 (q) if said lag limit has been met, determining if said maximum wavelet order limit has been met;
 (r) if said lag limit has not been met, performing another iteration of steps (h) through (r) until said lag limit has been met;
 (s) if said maximum wavelet order limit has been met, stopping; and
 (t) if said maximum wavelet order limit has not been met, setting said T=1 and performing another iteration of steps (h) through (t) until said maximum wavelet order limit has been met,
 wherein, if both said lag limit and said maximum wavelet order limit have been met, said efficient method of data mining is ended, resulting in an efficient identification of said desired features in said multi-band data set.

10. An efficient method of data mining to facilitate ready categorization of a data set dispersed over multiple bands, comprising:
 selecting at least one wavelet type for use in said method, wherein said wavelet is selected to achieve optimum computational efficiency;
 providing software for at least implementing an algorithm to calculate at least one wavelet-based generalized difference feature index (GDFI);
 specifying a set of generalized difference feature indices to be calculated using said efficient method of data mining;
 providing a software routine to select and process a reduced set of bands of said data set dispersed over multiple bands;
 iterating a sub-routine of said routine while applying a lag limit and a maximum wavelet order limit to establish a number of iterations, said sub-routine to at least:
  compute a reduced set of difference-sum band ratios;
  calculate said generalized difference feature indices;
  generate the cube of each said calculated generalized difference feature index;
  select pre-specified ones of said calculated generalized difference feature indices;
  threshold said selected calculated generalized difference feature indices,
 wherein said thresholding results in only said selected calculated generalized difference feature indices being used henceforth; and
  save said thresholded selected calculated generalized difference feature indices;
 wherein, if both said lag limit and said maximum wavelet order limit have been met, said efficient method of data mining to facilitate ready categorization of a data set dispersed over multiple bands is ended, resulting in an efficient identification of said desired features in said data set.

11. A method that samples all band ratio combinations in hyperspectral data for use with rapid combinatorial computations that integrate wavelet and wavelet-variogram techniques for improved data anomaly filtering, detection and classification of imagery, comprising:
 selecting at least one wavelet type for use in said method, wherein said at least one wavelet type is selected to achieve optimum computational efficiency; and
 providing software that displays results in a form that facilitates classification and feature extraction tasks while employing a least-ordered said wavelet that enables select features to be readily identified, wherein executing said software yields band ratios that provide useful information in support of said classification and feature extraction tasks, and wherein said method yields select said imagery with specific features highlighted by employing at least one generalized difference feature index (GDFI) band ratio and multiplying said generalized difference feature index (GDFI) band ratio by constants associated with coefficients of said at least one wavelet type, said GDFI band ratio defined by:

$$GDFI_{2n}(i, t) = \frac{h_o z_i + h_1 z_{i+t} + \ldots + h_{(2n-1)} z_{i+(2n-1)t}}{g_o z_i + g_1 z_{i+t} + \ldots + g_{(2n-1)t} z_{i+(2n-1)t}},$$

where $GDFI_{2n}(i, t)$ is a wavelet-based generalized difference feature index, i refers to band i of a data collector, t is a lag between bands, $h_0, h_1 \ldots h_{2n-1}$ are high frequency coefficients $g_0, g_1 \ldots g_{2n-1}$ are low frequency coefficients, wherein, the number of said high and low frequency coefficients is determined upon establishing the order of said wavelet type, n is the number of vanishing moments of said selected wavelet type, and $z_i, z_{i+t} \ldots z_{i+(2n-1)t}$ are data used to yield at least one said generalized difference feature index; and wherein at least one said feature appears in a resultant display as a distinct color or shade lighter than the remainder of said imagery.

* * * * *